Feb. 12, 1974 W. W. OFFUTT 3,792,141

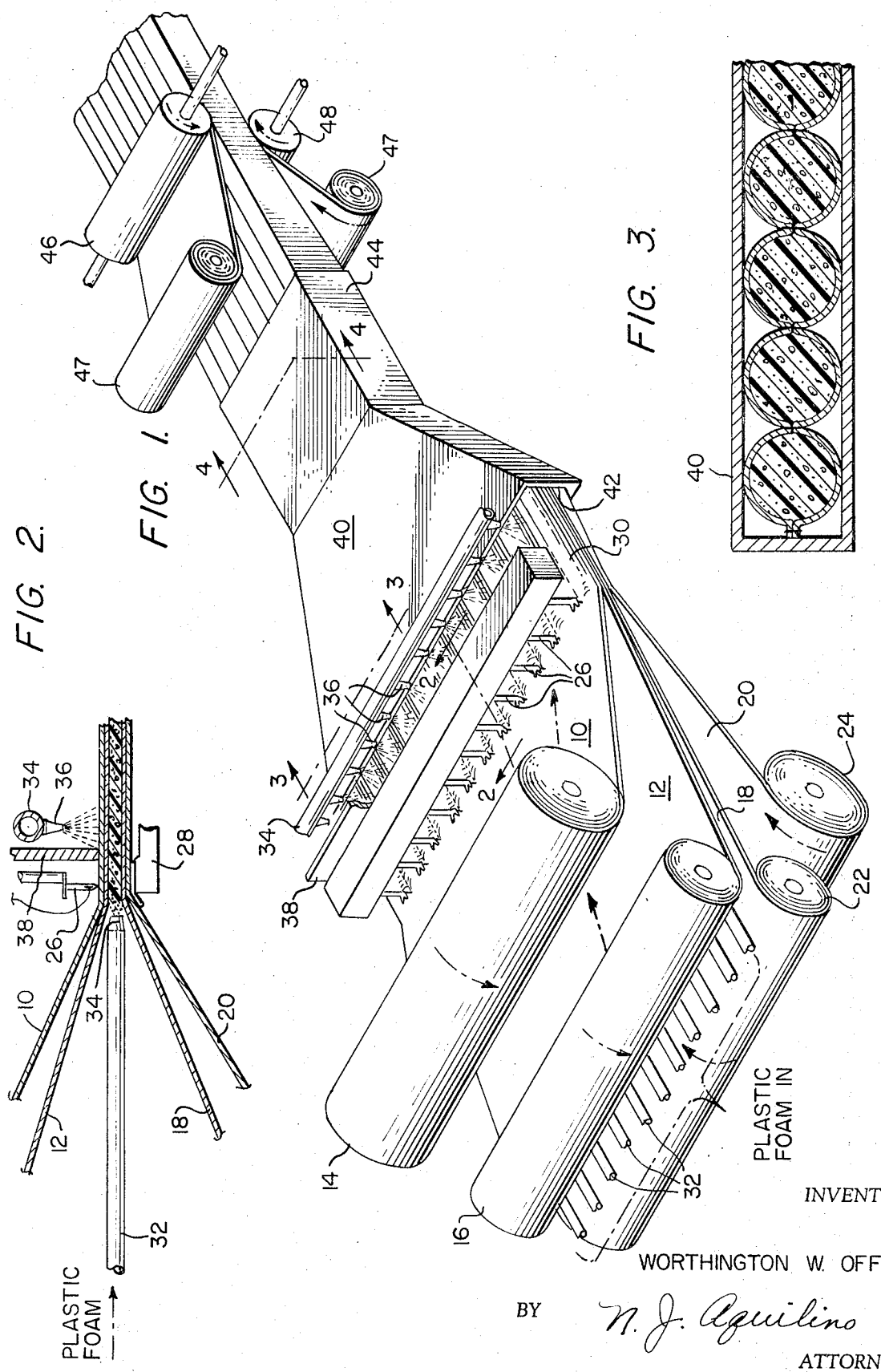

METHOD OF STRUCTURAL FABRICATION

Filed May 26, 1972 4 Sheets-Sheet 2

INVENTOR
WORTHINGTON W. OFFUTT
BY N. J. Aquilino
ATTORNEY

FIG. 8.
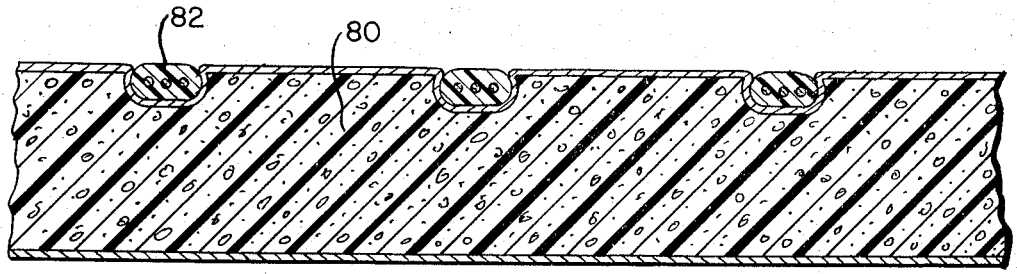
FIG. 9.
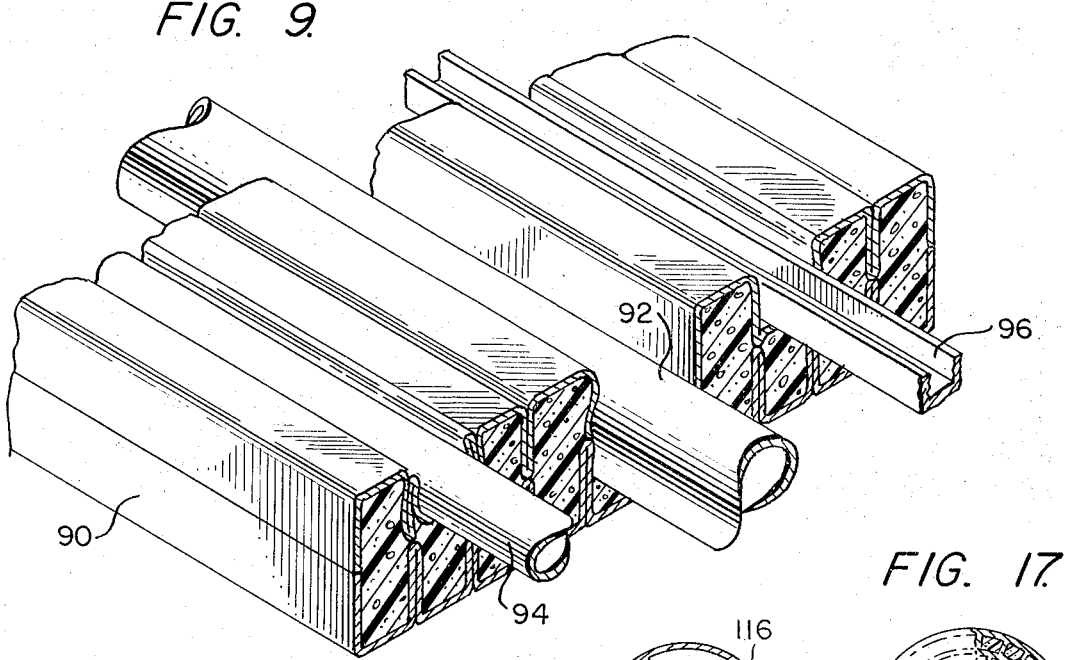
FIG. 17.
FIG. 16.
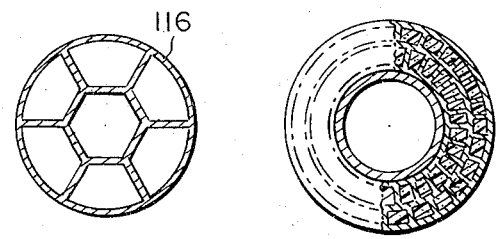
FIG. 10.
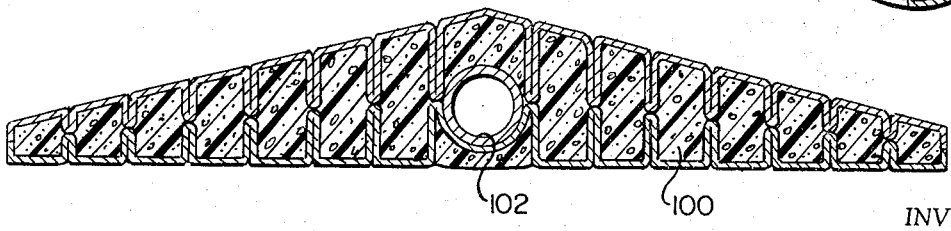
INVENTOR
WORTHINGTON W. OFFUTT
BY  *N. J. Aquilino*
ATTORNEY

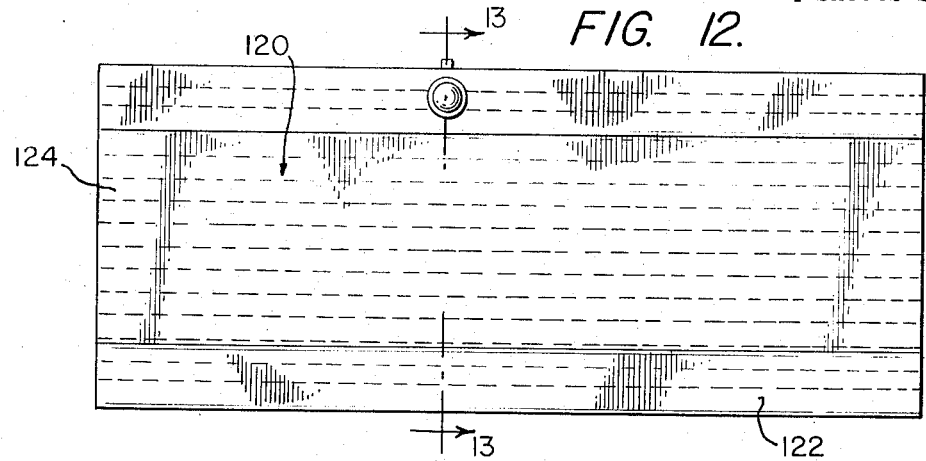
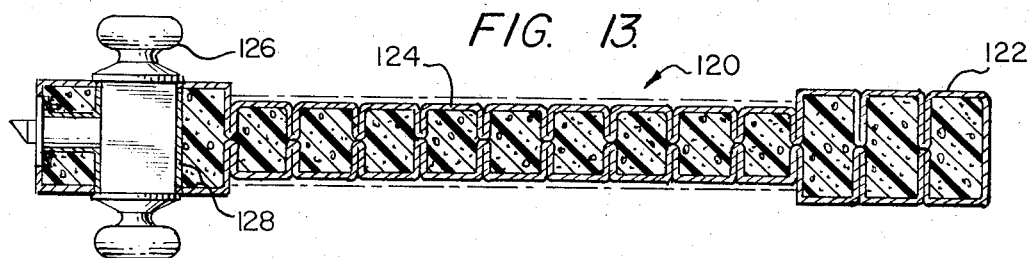
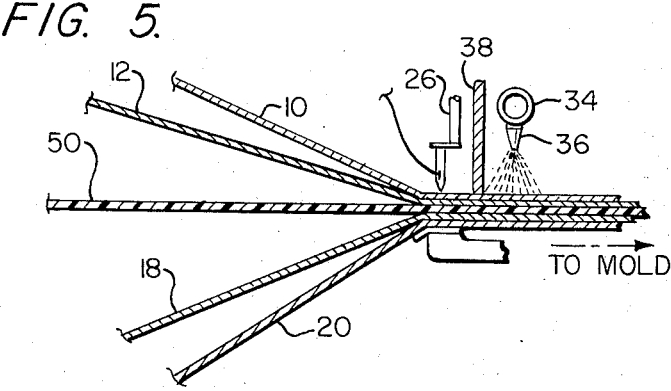
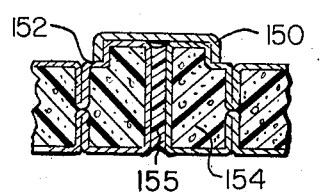
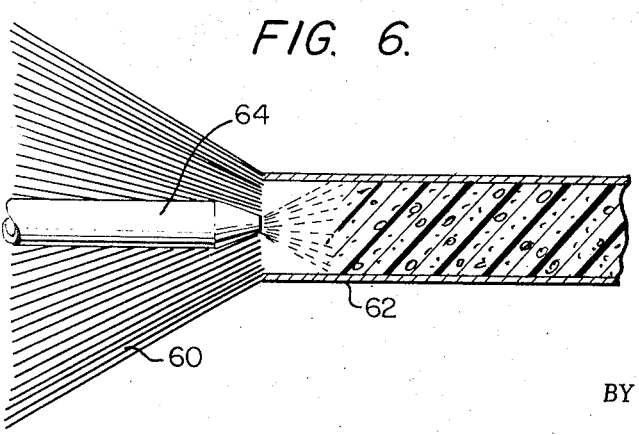
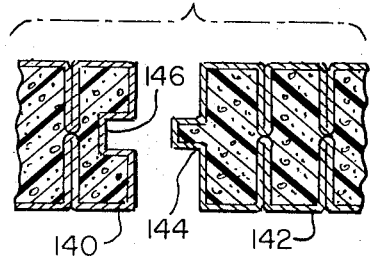

United States Patent Office 3,792,141
Patented Feb. 12, 1974

3,792,141
METHOD OF STRUCTURAL FABRICATION
Worthington W. Offutt, Cathedral City, Calif.
(522 N. Calle Marcus, Palm Springs, Calif. 92262)
Continuation-in-part of abandoned application Ser. No. 47,834, June 19, 1970. This application May 26, 1972, Ser. No. 257,394
Int. Cl. B29d 27/00; B32b 7/08, 31/12
U.S. Cl. 264—47
18 Claims

ABSTRACT OF THE DISCLOSURE

A structural product formed by passing a foam-filled, resin-impregnated fiberglass laminate into a preformed mold or extrusion to shape and cure the material into an insulated, pre-fabricated, lightweight, cellular structure.

RELATED DISCLOSURES

This application is a continuation-in-part of co-pending application Ser. No. 47,834, filed June 19, 1970, entitled "Method of Structural Fabrication," now abandoned.

BACKGROUND OF THE INVENTION

The present invention relates generally to fabrication methods and more particularly to the improved fabrication of bonding reinforced sheets, tubes and other structural configurations into lightweight, load-bearing, insulated, cellular, integrated structural members of high strength-to-weight ratios.

Modern construction techniques call for increased versatility of structural building components. Features such as durability, rigidity, versatility, strength, lightness of weight, ease of fabrication and handling are of prime interest in the construction industry. Conventional materials such as steel and wood are being replaced or supplemented by plastics and other synthetic and natural products toward accomplishing the above objectives.

Various procedures have been developed in recent years to fabricate building members by precasting, tensioning, extruding, weaving, laminating and other methods. Many of these require complicated design, expensive multi-state labor, time and equipment utilizing old fashioned mechanical fasteners such as nails, bolts, screws, welds, crimps, etc., frequently requiring job-site fabrication which is subject to various construction site inefficiencies.

Such structures and components have various disadvantages such as being too heavy and inflexible in their adaptation. They also tend to be unstable and have poor weather, insulation and/or fire resistance characteristics. These materials are expensive and prohibit high-volume, low-cost construction. This is particularly true where escalating labor and material costs, load-size and weight of structural components and transportation difficulties limit or preclude their use in today's markets. For example, glass fibers are presently being woven and shaped into structural members, which when impregnated and cured, find great strength relative to bending, compression, shear and tension. While such members are desirable from their structural properties, their cost per foot has been high and for economic reasons their use is restricted.

SUMMARY OF THE INVENTION

The present invention is directed to a simple and inexpensive method of producing structural members suitable for all types of commercial, residential or industrial structural applications. These members are formed of a resin impregnated core or shell which is filled with an expandable material such as plastic foam and covered with a suitable finishing material. In a preferred method of making these members, elongated sheets of fiberglass fabrics are sewn together at spaced intervals and filled with materials, foam, gas and/or air capable of expansion at elevated temperatures, vacuums or pressures. Resins or similar bonding agents capable of being polymerized, etc. are sprayed, flowed or otherwise applied to the laminate and it is passed into a mold or extrusion and shaped to configuration of the desired finished product where the resins are cured and the plastic foam is expanded to conform with the interior of the mold.

Where additional features are desired, for example in building panels, such things as heating or air conditioning ducts, voids, plumbing, hardware, electrical wiring and so forth may be formed integrally with the panels before it is finally molded.

Any type of finish may be molded into panel members or embossed in them as they emerge from the mold. Similarly, various types of conventional finishes or overlay materials may be added to the finished product to enhance its durability, esthetic, structural or ornamental features.

One of the advantages of the structural members formed according to the present invention is its extreme lightness. This feature allows quicker fabrication at the factory, less expensive labor costs, eliminates handling equipment, lowers the cost of shipment and permits more rapid erection at a utilization site.

The lightness of the members permits unitized roofs, walls, floors or other building sections to be assembled at a factory rather than at a construction site. For example, a finished roof may be flown by helicopter and put in place directly from the factory. Moreover, smaller units such as cabins, boats, trailers, pipe, or other structural members are also readily movable by helicopter and have few of the disadvantages associated with highway travel such as limits to weight, length, height or width.

The feature of corrosion resistance permits the structural members to be used in any outdoor or manufacturing environment, even where acids, salt air and water are problems.

As mentioned above, hardware, electrical wiring, plumbing and so forth can be fabricated as an integral part of the structural members so as to form complete building units.

The structural members are prefinished, waterproof, fire proof or retardant, insulating, rot proof, and termite proof with long life characteristics and negligible deterioration or upkeep problems.

Still another feature of the structural members is ease of fabrication of the components into finished structures with conventional tools, hardware or adhesives.

Where the structural member is a floor, it may sit directly upon the ground because of its insulating, moisture and vermin-proof qualities.

Among the objects of the present invention is the provision of a structural member which is lightweight, load bearing, insulated, cellular, corrosion resistant and which has a high strength-to-weight ratio, the provision of a structural member which can be readily adapted into a complete building unit, the provision of a structural member which is easily finished or molded into a specific shape or design configuration and a method of forming such structural members which is fast, economic and less complex than known methods of producing natural or man-made structural materials, components, or structures.

Other objects and further scope of applicability will become more apparent in view of the following description.

DESCRIPTION OF THE DRAWINGS

FIG. 1 is a perspective view of the apparatus used with the present invention;

FIG. 2 is a sectional view taken along the line 2—2 of FIG. 1;

FIG. 3 is a sectional view taken along the line 3—3 of FIG. 1;

FIG. 5 is a partial sectional view of an embodiment of the apparatus of the present invention;

FIG. 6 is a partial sectional view of a second embodiment of the apparatus of the present invention; and FIGS. 7 to 17 are partial sectional views of various products made in accordance with the present invention.

DESCRIPTION OF THE PREFERRED EMBODIMENTS

Figure 4:
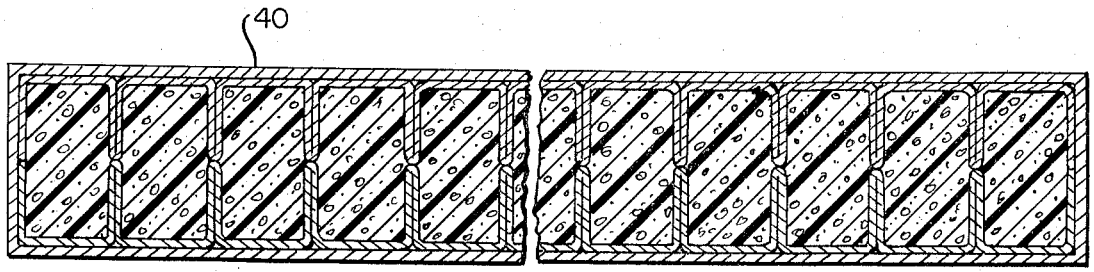
FIG. 4 is a sectional view taken along the line 4—4 of FIG. 1.

FIGS. 1 and 2 illustrate schematically a preferred apparatus for making one type of structural member of the present invention.

Two upper sheets of fiberglass 10 and 12 are continuously supplied from rolls 14 and 16. Two lower continuous sheets 18 and 20 are also supplied from similar rolls 22 and 24. These sheets are then fed together to form a foam ply laminate which passes a work station where they are fastened together longitudinally, preferably by means of conventional sewing apparatus including needles 26 and bobbin plate 28. As illustrated, the sewn stitches 29, hereafter referred to as sewing junctions, produce a series of longitudinal fiberglass sleeves or pockets 30 which are filled with foam capable of expansion under the influence of chemicals, temperature, pressure or vacuum.

Any foamable composition capable of expansion under the above conditions is suitable for use with the present invention. For example, the foam may comprise any of the polyurethane foams, polystyrene foams, phenolic resin foams, silicone foams, cellulose acetate foams, acrylic foams, epoxy foams, polyolefin foams, polyvinylchloride foams, polyester foams and the like.

Thus, a suitable polyurethane foam would comprise two parts Wyandotte Pluronic L–61, which is a polyoxyalkylene derivative of propylene glycol having an average molecular weight of 2000, and one part of Wyandotte Tetronic 701, which is a polyoxyalkylene derivative of ethylene diamine having an average molecular weight of 2501–3000; to each 100 gms. of the above mixture would be added 31.84 gms. of toluene diisocyanate (80/20) and 0.5 gm. of silicone DC–200 (50 cst.). A suitable catalyst for the above prepolymer is 1.1 parts of water, 1.0 part of N-methylmorpholine and 0.2 part triethylamine for each 100 parts of the prepolymer. Ordinarily, the catalyst would be added to the prepolymer immediately prior to or during the foaming reaction. And; by varying the catalyst, the foaming reaction can be expedited or delayed. In addition, a catalyst can be used which is stable at room temperatures but which is activated by elevated temperatures.

Similarly, a suitable polyvinylchloride foam could be prepared from any of the commercially available dispersion grade resins, with polymers of vinyl chloride having specific viscosities above about 0.17 and preferably between 0.17 and 0.31, as measured in a solution of 0.2 gm. resin in 100 mls. of nitrobenzene at 20° C. being particularly effective. In the determination of specific viscosities, the sample of resin in nitrobenzene solution maintained at a temperature of 20° C. is allowed to flow between two calibrated marks in a pipette and time required is recorded. This time is compared with the time required for a control of pure nitrobenzene solvent to pass between the same two marks, also at a temperature of 200° C. The specific viscosity is determined as the sample flow time divided by the control flow time minus 1. The specific viscosity is an effective measure of relative molecular weight of the polymer, the higher the specific viscosity the higher being the molecular weight.

The intrinsic viscosity is another method for determining molecular weight. Resins are preferred which have an intrinsic viscosity of from about 0.75 to about 1.3. The intrinsic viscosity is obtained from viscosity measurements, at 30° C., of cyclohexanone solution of the resin and of cyclohexanone solvent. The intrinsic viscosity $[\eta]$ is defined by the equation $$[\eta] = C \lim_{\to} -0 \frac{(\ln \eta_{rel.})}{C}$$

when $\eta_{rel.}$ is relative viscosity and C is the concentration of polymer in grams per 100 cc. the concentration being such that $\eta_{rel.}$ has value of from 1.15 to 1.4.

In formulating the vinyl foam compositions, the vinyl chloride resin is uniformly dispersed in a mass of fluid plasticizer in a plastisol or with plasticizer and organic solvent with an organosol. The fluidity of plastisols is influenced in part by the particular resin selected but is also a function of the ratio of plasticizer to resin. Plastisols become less fluid as the ratio of plasticizer to resin is reduced. Compositions for use in the invention contain from about 45 to about 80 parts plasticizer per 100 parts resin with a range of about 60 to about 70 parts plasticizer per 100 parts resin being particularly effective for the foamable coating. The plasticizer level of the wear layer composition can be as low as 28 parts per 100 parts of resin up to about 50 parts with 30 to 40 parts of plasticizer per 100 parts of resin being preferred. The viscosity of the compositions can be reduced by the addition of a volatile diluent. Plastisols usually contain less than 10 parts per 100 parts resin of diluents. Useful diluents include benzene, toluene, methyl ethylketone, petroleum solvents such as V.M. & P. Naphtha (boiling range of 190–275° F.) and the like.

The selection of the plasticizer is important in determining the strength and flexibility of the foamed end product and also in influencing the viscosity, and the foaming characteristics of the compositions. Esters of straight and branched chain alcohols with aliphatic acids impart low viscosity and good viscosity stabiilty. Typical plasticizers of this type include dibutyl sebacate, dioctyl sebacate, dioctyl adipate, didecyl adipate, dioctyl azelate, triehtylene glycol di(2-ethylhexanoate), diethylene glycol diprelargonate, triethylene glycol dicaprylate and the like. Plasticizers of the aromatic type, such as esters of aliphatic alcohols and the aromatic acids or aromatic alcohols and aliphatic acids or aromatic alcohols and aromatic acids are desirable in that they impart good foaming characteristics to a plastisol, although the use of highly aromatic plasticizers is limited by their tendency to yield plastisols of high viscosity. Typical plasticizers of this type include dibutyl phthalate, dicapryl phthalate, dioctyl phthalate, dibutoxy ethyl phthalate, dipropylene glycol dibenzoate, butyl benzyl sebacate, butyl benzyl phthalate, dibenzyl sebacate, dibenzyl phthalate and the like. Other types of plasticizers, such as esters of inorganic acids, including tricresyl phosphate, octyl diphenyl phosphate and the like, alkyd derivatives of resin, chlorinated paraffins, high molecular weight hydrocarbon condensates and the like can also be used. The plasticizer or blend of plasticizers is chosen to yield a composition of the desired viscosity and/or foaming characteristics.

The foamable compositions contain, in addition, an effective amount of blowing agent. The larger the amount of blowing agent within practical limits used the greater is the expansion of the foam. Foam densities of from about 12 to about 40 pounds per cubic foot can be readily attained. Such results are attainable with from about 1 to about 20 parts blowing agent per 100 parts resin.

The amount of blowing agent will depend in large measure on the efficiency of the agent.

Complex organic compounds which, when heated, decompose to yield an inert gas and have residues which are compatible with the resin used in the compositions are preferred as blowing agents. Such materials have the property of decomposition over a narrow temperature range which is particularly desirable for obtaining a good foam structure. Compounds having the

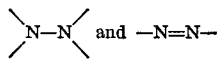

linkages decompose at elevated temperatures to yield a gas mixture high in nitrogen. Typical compounds include substituted nitroso compounds, substituted hydrazides, substituted azo compounds and the like, such as are tabulated in Table 1:

TABLE 1

| Blowing agent | Decomposition temperature, °F. |
|---|---|
| Dinitrosopentamethylenetetramine | 355–375 |
| Azodiformamide | 325–400 |
| 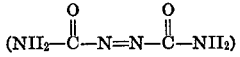 | |
| p,p'-Oxybis (benzene sulfonyl hydrazide) | 300–340 |
| Azobisisobutyronitrile | 220–250 |
| N,N'-dimethyl-N,N'-dinitrosoterephthalamide | 190–300 |

The decomposition temperature depends in large measure on the particular composiiton. Catalyst can be added to aid in the decomposition and change the temperature range.

Blowing agents for use in the invention must be decomposed at an effective rate at a temperature below the decomposition temperature of the resin used but above the elastomeric point of the resin composition. A layer of resinous foam has heat insulating properties with the result that fusion of a prefoamed layer is very difficult and extremely slow. Therefore, in the case of compositions formulated with the preferred vinyl chloride polymers, a blowing agent decomposing between about 300 and 450° F. should be used. The minimum initial decomposition temperature must be sufficiently high that no premature gas evolution occurs during mixing of the composition and the serving operation.

In general, vinyl chloride polymer compositions attain body through partial gellation when heated to about 200° F. Thus, the minimum decomposition temperature should be about 200° F. or higher.

The degree of foaming of a typical plastisol formulation using different concentrations of blowing agent is shown in Table 2:

TABLE 2

| Parts azodiformamide 100 parts resin | Ratio of foam thickness to original thickness | Density, lbs. per cu. ft. |
|---|---|---|
| 0.0 | 1/1 | 80 |
| 0.1 | 1.33/1 | 60 |
| 0.5 | 2/1 | 40 |
| 1.0 | 3/1 | 27 |
| 2.0 | 4.5/1 | 17.5 |
| 3.0 | 6.5/1 | 12.3 |
| 5.0 | 9.3/1 | 8.6 |

For the purpose of illustration, typical foamable vinyl formulations are shown in Examples I–IV:

EXAMPLE I

A foamable plastisol was formulated by grinding the following ingredients on a conventional three-roll mill:

| | Parts |
|---|---|
| Vinyl chloride-vinyl acetate copolymer (dispersion grade) | 100 |
| Dioctyl phthalate | 30 |
| Dipropylene glycol dibenzoate | 30 |
| Stabilizer | 6 |
| Finely divided titanium dioxide | 2.5 |
| Azodiformamide foaming agent | 2.5 |

The plastisol had a viscosity of 16,800 centipoises at 25° C. as measured with a Brookfield viscometer using a No. 6 spindle at 10 r.p.m. This plastisol can be pigmented as desired.

EXAMPLE II

The following ingredients in the proportions indicated were ground on a three-roll mill:

| | Parts |
|---|---|
| Polyvinyl chloride (dispersion grade) | 100 |
| Petroleum hydrocarbon condensate [1] | 18 |
| Butyl benzyl phthalate | 52 |
| Pigment | 3 |
| Stabilizers | 4 |
| Azodiformamide foaming agent | 3.5 |

The plastisol had a viscosity of 4,000 centipoises as measured with a Brookfield viscometer using a No. 6 spindle at 10 r.p.m.

[1] Conoco 300—Continental Oil Company, Ponca City, Okla.

EXAMPLE III

The following ingredients were ground on a three-roll mill:

| | Parts |
|---|---|
| Polyvinyl chloride (dispersion grade) | 100 |
| Petroleum hydrocarbon condensate [1] | 18 |
| Butyl benzyl phthalate | 52 |
| Pigment | 3 |
| Stabilizers | 4 |
| Azodiformamide foaming agent | 1 |
| V.M.&P. naphtha (boiling range 190–275° F.) | 5 |

[1] Conoco 300—Continental Oil Company, Ponca City, Okla.

The plastisol had a viscosity of 2,000 centipoises as measured with a Brookfield viscometer using a No. 6 spindle at 10 r.p.m.

EXAMPLE IV

The following ingredients in the proportions indicated were ground on a three-roll mill:

| | Parts |
|---|---|
| Polyvinyl chloride (dispersion grade) | 100 |
| Didecyl phthalate | 50 |
| Didecyl adipate | 25 |
| Stabilizer | 5 |
| Pigment | 2 |
| Wetting agent | 3.5 |
| N,N' - dimethyl - N,N' - dinitrosoterephthalamide foaming agent | 5 |

The above described or equivalent foamable composition is inserted into the sleeves 30 formed at the sewing station by the sewing junctions 29, preferably by a series of supply pipes 32, the ends of which include a nozzle 34.

Directly down line from the sewing station, the fiberglass sheets, now in the form of a series of attached longitudinal sleeves filled with a foamable composition, are saturated with a resin or bonding agent which is capable of being hardened when it is polymerized or otherwise cured. Such resins would include the phenolics, polyesters, isocyanate elastomers, epoxy resins, acrylics, and the like. A particularly suitable class of bonding resins would include a thermosetting resinous composition prepared by initially reacting phenol and formaldehyde to the A or B stage of condensation, and then adding crystalline urea, either in solid or liquid form, followed by the addition thereto of a curing agent, such as hexamethylene tetramine, to harden the composite resinous composition. More specifically, the suitable phenol formaldehyde condensation product can be produced according to conventional condensation procedures, for example, in a two stage synthesis using an alkaline catalyst, where the ratio of formaldehyde to phenol can vary considerably, e.g., from 0.9–4.0 to 1. However, it is preferable to employ an excess of formaldehyde over and above stoichiometric molar amounts. Thus, for example, the formaldehyde to phenol molar reaction ratio can range from about 1.0–3.0 to 1.

The urea component is crystalline urea, which can be employed in solid form as granules or pellets or can be dissolved in water (liquid form) and added to the aqueous system containing the phenol-formaldehyde condensate.

The weight percentage of crystalline urea based on the total polymeric component of the binder usually ranges from about 5 to about 70 percent by weight of the total polymeric component. Conveniently the weight percent of urea in the polymeric component ranges from 25 to 50 percent by weight. Preferably, the weight percentage of crystalline urea ranges from about 30 to 45 percent of the total polymeric component of the binder. Usually at least 5 percent by weight of the total polymer content is crystalline urea.

An oleaginous lubricant and processing aid can be employed in the binder composition in order to lubricate the glass fibers of the fiberglass sheets. A suitable lubricant material for use in accordance with the present invention in "Tybon Dark Oil," a product of Pacific Resins and Chemicals Inc. "Tybon Dark Oil" is a chemically modified, high-flash, water-soluble, high-viscosity mineral oil which is in emulsion form without requiring the use of additional dispersing agents or wetting agents and has a solids content of approximately 45 percent by weight. "Tybon Dark Oil" has a weight per gallon of 8.0 pounds, a flash point (open cup) of 600° F. and a freeze-thaw resistance which is good after 10 cycles.

Another class of adjuvant materials which can be included in the binder are silane coupling agents. Especially preferred silane materials are those which not only function as a coupling agent but also serve as a lubricant and wetting agent. Amino-alkyl trialkoxy silanes constitute the preferred class of silane materials and gamma-aminopropyl triethoxy silane being the amino-alkyl trialkoxy silane of choice. Gamma-aminopropyl triethoxy silane is available under the trade names "A–1100" and "Silicone A–1100," and can be used either alone or in admixture with "Tybon Dark Oil" or other lubricants. The silane material can be employed in amounts ranging from 0 to about 10 percent by weight of the non-aqueous component. When a silane material is employed, the preferable weight concentration ranges from 0.5 to 5 percent by weight of the solid (non-aqueous) component of the binder.

Another adjuvant material which can be included in the binder is a catalyst(s), and the catalyst can constitute from 0 to about 10 percent by weight of the non-aqueous component of the binder. As suitable catalysts the following materials can be listed as exemplary of those which can be employed for this purpose in conjunction with this invention; ammonium chloride; ammonium sulfate; ammonium nitrate; ammonium bromide; ammonium iodide; ammonium fluoride; etc. Ammonium chloride and ammonium sulfate are the catalyst materials of choice.

In addition of the above mentioned catalyst, an additional heat hardening (curing) catalyst, e.g. hexamethylene tetramine, can be employed to assist in heat setting the phenol-formaldehyde condensate to the water and solvent-insoluble stage. This curing catalyst can be initially dissolved in the aqueous binder, and applied along with the binder, e.g., by the spraying of the binder and catalyst mixture onto the foam filled fiberglass through a manifold pipe 34, having a series of nozzle 36. In such case, the manifold pipes 34 would be connected to a source (not shown) of the bonding resin and catalyst mixture, and a baffle 38, preferably of a semi-rigid plastic material, would be placed between the spray manifold 34 and the sewing station to prevent the bonding resin from fouling the sewing apparatus and to facilitate an even distribution of the bonding resin. Instead of coating and/or impregnating the binder formulation onto the glass sheets by spraying, the glass fiber mat can be impregnated with the binder formulation by any of the conventional coating and/or impregnation techniques known in the art. For example, the binder can be applied by a flow-coating procedure or by immersion of the glass sheets into a bath containing the aqueous binder composition. In such cases, the binder formulation is allowed to drain from the resin coated, foam filled glass sheets into a drip pan (not shown) which is provided to catch the excess resin which might drop from the saturated fiberglass sheets. However, in a preferred embodiment, a curing catalyst is included in the aqueous binder formulation and the mixture is applied by spraying. In this manner it is possible to secure more uniform distribution of the curing agent on the glass fiber sheet.

When catalyst(s) are included, the combined weight of catalyst material(s) ranges from 0.5 to 10 percent by weight of the non-aqueous component of the binder. Preferably the curing agent is employed in amounts ranging from 2 to about 4 percent by weight of the total polymeric component (phenol-formaldehyde condensate plus crystalline urea).

Typical formulations of a phenolic bonding resin suitable for use herein are described in Examples V–VII below:

EXAMPLES V–VII

In Examples V and VII aqueous thermosettable binder compositions were prepared by dissolving the indicated proportion of a commercial A stage phenol-formaldehyde condensate into water with vigorous stirring. Then the crystalline urea was added either in granule or pellet form. The lubricant material was thereafter added in the amounts indicated (where applicable) in the various examples. This mixture was then stirred until all of the materials were dissolved therein. Following this, ammonium chloride (curing catalyst) was added in the proportions indicated in the table. The mixture was then stirred to insure uniform distribution of the catalyst in the binder mixture. Then pH control agent (ammonium hydroxide) was added thereto, and the mixture was again stirred to insure uniform distribution of the pH control agent. The pH of the mixture was then noted. The thermosetting reaction mixtures of the various binders were then to stand overnight at standard temperature and pressure and the stability of the respective binder compositions was noted. Samples of each binder solution were then coated onto glass plates six inches by six inches by one quarter inch and placed in an oven for curing at the temperatures indicated. The duration of each cure was 30 minutes. As will be noted from the table above, the clarity of color and the condition of the binder on the glass plates was checked after removal from the curing oven. Following the curing operation, the thus coated samples were soaked in water by submerging the coated plates so that the binder film was completely covered by water for a period of approximately 48 hours. Any changes in color and condition of the binder after the water soaking were noted and appear in the table below:

TABLE 3

| Example | Percent by wt. of non-aqueous components | | | | Grams/qt. pH control agent (ammonium hydroxide) | pH | Percent by wt. solids [2] |
|---|---|---|---|---|---|---|---|
| | "A" stage phenol formaldehyde condensate | Crystalline urea | Lubricant and water repellent (tybon dark oil) | Percent by wt. curing catalyst [1] | | | |
| V | 99 | 1 | | 2.0 | 10.0 | 8.0 | 9.6 |
| VI | 95 | 5 | | 2.0 | 10.0 | 8.2 | 9.8 |
| VII | 90 | 10 | | 2.0 | 10.0 | 8.2 | 11.6 |

| Example | Binder stability overnight at, S.T.P. | Color and glass adhesion condition of binder after curing for 0.5 hour at— | | Color and condition of binder after curing and soaking, curing for 0.5 hour, at— | |
|---|---|---|---|---|---|
| | | 300° F. | 350° F. | 300° F. | 350° F. |
| V | Good | Clear greenish tan; good | Clear tan; good | No change | No change. |
| VI | do | do | do | do | Do. |
| VII | do | Clear greenish yellow; good | Clear greenish tan; good | do | Do. |

[1] Based on total solids content of non-aqueous portion of binders.
[2] In aqueous binder at time of preparation.

After the resinous binder formulation is applied, the resin saturated laminate of fiberglass sheets and foamable composition is fed into a mold 40 or continuous type casting or extruding aparatus where the binder and foamable compositions are subjected to heat and cured. The heat may be supplied by any suitable heat source, such as resistance heating coils (not shown) embedded in the wall structure of the mold 40. Similarly, heat may be supplied by gas burners (not shown) which heat the resin saturated laminate via forced gas heat. Of course, heat can be applied to the resin saturated laminate from the top side only, bottom side only, or various combinations of both upper and lower heating schemes can be used. Generally the combined heating and curing operation will be conducted at temperatures ranging from about 300° F. to about 600° F. with the more preferable temperature range being from about 375° F. to 475° F. During the curing operation, substantially all of the water is evaporated from the binder formulation leaving essentially a solid binder on the glass sheets. In addition, the heating will cause the foamable composition to expand. The time involved for curing will depend among other factors upon the formulations of the bonding resin composition and the foamable composition. Of course, the thickness of the glass sheets, and the relative amounts of the bonding composition and foamable composition must also be taken into consideration. Thus, the curing times contemplated herein might range anywhere from a few seconds to a few minutes, or even a few hours, with times in the range of about 10 seconds to about 30 minutes being typical.

Figure 4A:
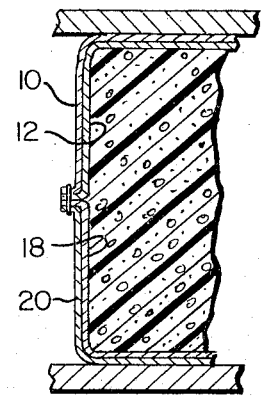
FIG. 4a is a view of a detail of FIG. 4.

As illustrated in FIG. 1, the entrance 42 of the mold 40 is large enough to accommodate the expanded laminate structure, the entrance 42 being larger than the outlet 44. Thus, when the laminate is at the inlet 42 of the mold 40, the series of foam filled sleeves 30 will assume the generally rounded, configuration shown in FIG. 3. As the laminate is fed into the mold 40, it is subjected to heat and/or other variables causing the foam to expand toward the walls of the mold 40. FIGS. 4 and 4a illustrate in cross section, the expanded foam filled sleeves which tend in this illustration to take a square shape in accordance with the shape of the mold 40. The shape of the mold 40 gradually tapers toward the dimensions of the final product, so that as the material leaves the outlet 44 of the mold, the foam has completely expanded to its desired dimensional limits and the resin has hardened to form an interim shape and/or the end product. A pair of powered pinch rollers 46 and 48 continuously draw the completely structural material from the mold 40 and feed it to a subsequent processing station (not shown) where cutting, further shaping, bonding and/or other finishing steps take place. The rollers 46 and 48 may also act as final shapers or embossers for the finished laminate material.

It will be appreciated that above description was illustrative only and numerous variables are considered to be within the scope of the invention. For example, the number of fiberglass or other sheets used, the number of needles, the spacing between rows of stitches or sewing junctions, the number of nozzles and the size of the mold all depend upon the size, flexibility, rigidity, insulation, shape, strength and other features desired in the finished product. Furthermore, overlay layers of fiberglass, metal and/or other material in various numbers may be provided to add strength and optional finishes to the final product. The fiberglass, bonding resin and foamable composition used in the process of the subject invention are not intended to be limiting but are intended to include various compounds, chemicals and products suitable for the above mentioned purposes and applications.

It will also be appreciated that various additional finishing steps are compatible with the finished product of the invention including reshaping, bonding, embossing, plating, painting and so forth.

Also, should it be desired to provide stronger or thicker panels, two or more of the resin saturated, foam filled fiberglass laminates or units may be fed simultaneously into a mold designed for larger product dimensions. In this configuration, the laminates will bond together as the bonding resin is cured.

Also any and all finished shapes are contemplated by the present invention simply by changing the stitching, the input and output configuration of the mold. For example, it would be possible to form a large structural column or multiple-sectional conduit by rolling the flat, impregnated foam and fiberglass materials into a cylindrical shape within the mold.

An alternate embodiment of the present invention is shown in FIG. 5. Here, instead of providing the expandable foam by means of injection nozzles, a thin layer or sheet 50 of a partially expanded foam composition, such as a partially expanded polyurethane foam sheet, is sewn between the fiberglass sheets. When this partially expanded foam sheet is fed into the mold, the conditions within the mold cause the partially expanded foam sheet to further expand as described above to conform with the dimensions of the mold. Another possible variation would be to spray, roll or otherwise apply a foamable composition on the inner sides of sheets of fiberglass before they are fed into the mold.

It is also contemplated by the present invention that the fiberglass may be woven, felted or knitted, much as a sock with an opening at both ends, into a series of elongated cylindrical sleeves which are then filled with an expandable foam composition. Such an arrangement is shown schematically in FIG. 6, wherein a number of fiberglass strands 60 are formed into an elongated sleeve 62, for example, by a commercial knitting machine, which is filled with a foamable composition from an injection nozzle 64. It is apparent that any number of these foam filled sleeves could then be placed together and simultaneously sprayed with bonding resin and fed into a suitable mold for curing and shaping as described above.

Figure 7:
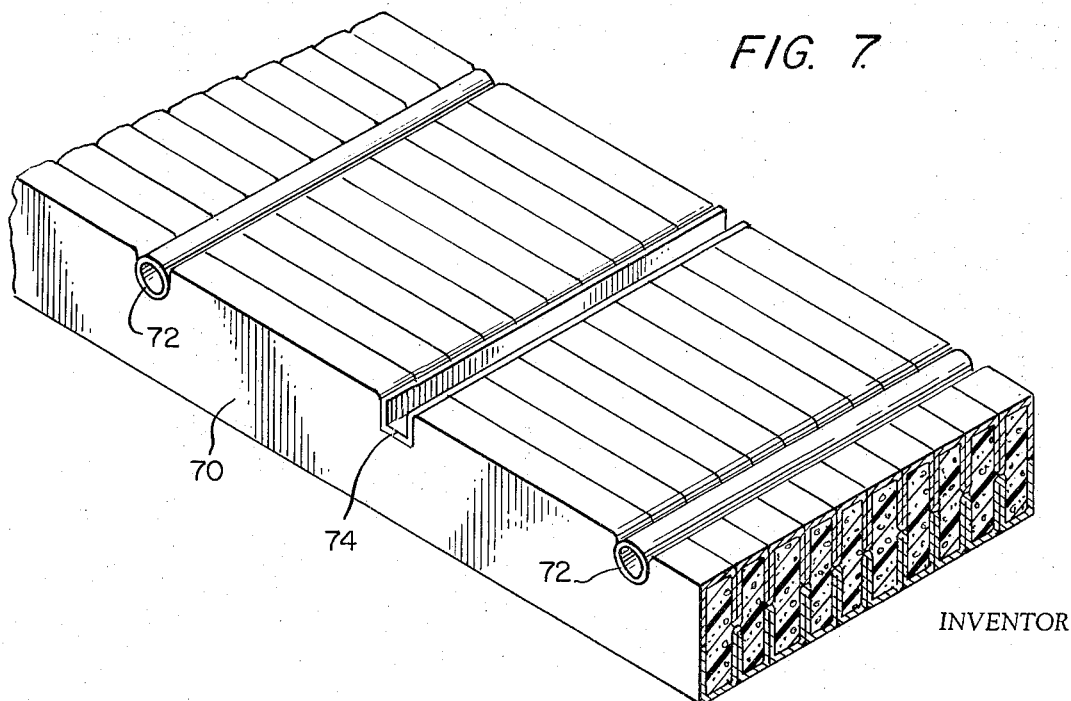

When the invention is used to form building panel structures, it would be desirable to optionally provide finished panels with integral piping, conduit, openings, electrical cable, radiation panels, or other service facilities. For example, FIG. 7 illustrates a finished building panel structure 70 formed according to the present invention. The panel is provided with conduit 72 and a channel 74 which is mechanically inserted transversely to the elongated fiberglass sleeves.

FIG. 8 shows a similar arrangement wherein electrical conduit 82, for example, is inserted within the molded fiberglass laminate 80, to form an integral structure before or after molding.

FIG. 9 illustrates a building panel structure 90 wherein a large conduit 92, a smaller conduit 94 and a channel 96 are formed longitudinally. Insulating foam may be applied on one or both sides of FIGS. 9 and 11, for example.

It will be appreciated that any combination of conduits, pipes, electrical wires, channels and any other building materials may be included within the structure of the present invention subject only to mechanical limitations of inserting and retaining the materials so that they may be integrally molded into the laminate structure. Suitable insulation, voids, openings, frames, hardware and connectors may also be included. It will also be appreciated any suitable number of insulating or finish layers may be provided as overlays on any of the finished products such as is shown in FIGS. 7, 8 and 9.

FIG. 10 illustrates an example of a building roof structure wherein the structural member 100 is tapered and which is provided with a pipe conduit 102 in its center.

Figure 11:
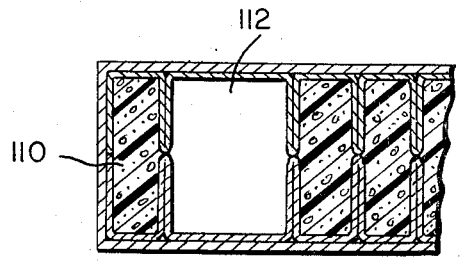

FIG. 11 shows a detail of a structural member 110 which is formed with a void 112 so as to provide a facility for such things as heating or air conditioning ducts. These voids may be formed by using a removable insert in the mold, materials that are dissolvable or otherwise removable or can be formed by introduction of compressed air, gas, etc.

FIGS. 12 and 13 show a structural member of the present invention used to make a door 120. This is accomplished by stitching layers of fiberglass in the manner shown to form a slab door or with a thicker member along the outer edges 122 and/or a thinner configuration of material along the center section 124 where intricate design may be molded into the panels. FIG. 13 shows in section a door including lock set hardware 126 of a conventional type mounted within a steel, wood or other insert or jacket 128. In construction the door 120 the variation in thickness is controlled by the spacing of the stitches in the fiberglass sheets before filling with a foamable composition and expansion in the mold. For example, section 124 is formed of stitches closer together than the wider section 122.

FIG. 14 shows two structural laminate building panels 140 and 142 which are provided with integrally formed tongue 144 and groove 146 connectors.

FIG. 15 shows another type of connector for use with the subject invention in the form of a metal or other cap 150 which connects two structural panels 152 and 154. The panels are each provided with raised end and/or side sections to accommodate the cap 150 and are shown separated slightly to allow for expansion and/or the introduction of a non-hardening compressable seal 155.

FIG. 16 illustrates a seven section pipe 116 formed in accordance with the present invention. The sections are hollow and may be formed with removable inserts, compressed air or dissolvable foam. This structure may be made using individual sleeves or with flat sheets sewn and rolled up together.

FIG. 17 shows still another application of the structural members formed with the present invention. The finished structural members 117 are formed arcuate in shape and are designed to insulate exposed or underground pipes such as steel oil pipe lines. By using several lays, two being shown, the insulation would keep the oil at a more fluid temperature and also act as a protective cushion against the elements, earthquakes, slides, ecology, etc.

It will be appreciated the above description is not limited to the embodiments described above, but the invention may be practiced within the scope of the following claims.

In the claims:

1. A continuous method of structural fabrication comprising sequentially the steps of fastening upper and lower web sheets of fabric by stitching at spaced intervals longitudinally to form a series of elongated fabric sleeves, the stitches defining sewing junctions between adjacent sleeves, injecting said sleeves with a foamable resin composition causing said sleeves to expand to a generally circular cross section, each of said sleeves being attached to an adjacent sleeve in a side by side relationship at the sewing junctions, saturating said filled sleeves with a curable bonding resin, passing said sleeves into a mold under heat and pressure causing the foamable resin composition to expand and the bonding resin to cure, such that the foaming action causes said generally circular cross sectional sleeves to expand outwardly against the walls of mold thereby assuming the shape of the mold and such that the bonding resin cures into a hardened state which forms a solid structure in the mold, and withdrawing said structure continuously from the mold.

2. The process of claim 17 wherein said upper and lower sheets underlay and overlay sheets are made of fiberglass.

3. The process of claim 2 wherein structural service members are formed integrally with said member by inserting said members into said mold along with said foam filled sleeves, whereby the foaming and bonding resins form around said members to provide an integral structure.

4. The process of claim 3 wherein said members include hollow conduit.

5. The process of claim 3 wherein said members include electrical cable.

6. The process of claim 1 wherein said sleeves are formed by sewing upper and lower sheets of fiberglass together and a partially expanded foamable resin composition is provided as a separate sheet laminated between said upper and lower sheets.

7. The process of claim 1 wherein said withdrawing step is accomplished by means of driven pinch rollers which provide final shaping of said structural member.

8. The process of claim 1 wherein said filled sleeves are saturated by positioning a spray manifold directly over said sleeves and spraying a bonding resin on said sleeves as they are conveyed past a spraying point.

9. The process of claim 1 wherein said filled sleeves are saturated by passing them through a bonding resin bath.

10. The process of claim 1 wherein the dimensions of said structural member is varied by varying the distance between the longitudinal rows of stitching.

11. The process of claim 1 wherein said structural member is formed in the shape of a building structure.

12. The process of claim 11 wherein said member is formed to the shape of a door and is further formed with integral hardware to make said door a complete structural unit.

13. A continuous method of structural fabrication comprising sequentially the steps of knitting a series of elongated fabric sleeves, spacing said knitted sleeves in a longitudinal, side by side relationship, injecting said sleeves with a foamable resin composition thereby expanding said sleeves into a generally circular cross section, saturating said filled sleeves with a curable bonding resin, passing said sleeves into a mold under heat and pressure causing the foamable resin composition to foam and the bonding resin to cure, the foaming action causing said generally circular cross sectional sleeves to expand outwardly against the walls of mold thereby assuming rectangular cross sections which form a solid structure upon emergence from the mold, and withdrawing said structure from the mold.

14. The process of claim 13 wherein said knitted sleeves are spaced in a circular configuration and passed in this manner into a corresponding mold to form a structure of a circular or semi-circular cross section.

15. The process of claim 13 wherein said upper and lower sheets underlay and overlay sheets are made of fiberglass.

16. The process of claim 13 wherein structural service members are formed integrally with said member by inserting said members into said mold along with said foam filled sleeves, whereby the foaming and bonding resins form around said members to provide an integral structure.

17. A continuous method of fabricating a structural member comprising the steps of:
fastening upper and lower web sheets of fabric by stitching at spaced intervals longitudinally to form a series of elongated fabric sleeves, the stitches defining sewing junctions between adjacent sleeves;
injecting said sleeves with a foamable resin composition causing said sleeves to expand to a generally circular cross section, each of said sleeves being attached to an adjacent sleeve in a side by side relationship at the sewing junctions;
saturating said filled sleeves with a curable bonding resin;
positioning underlay and overlay sheets of fabric adjacent the lower and upper surfaces of said sleeves;
passing said sleeves and said adjacent sheets of fabric into a mold under heat and pressure causing the foamable resin composition to expand and the bonding resin to cure, such that the foaming action causes said generally circular cross sectional sleeves to expand outwardly and assume the shape of the mold, such that the bonding resin cures into a hardened state, thus forming an integral structural member in the mold; and withdrawing said structural member continuously from the mold.

18. A continuous method of fabrication comprising the steps of knitting a series of elongated fabric sleeves, spacing said knitted sleeves in a longitudinal, side by side relationship, injecting said sleeves with a foamable resin composition thereby expanding said sleeves into a generally circular cross section, saturating said filled sleeves with a curable bonding resin, positioning underlay and overlay sheets of fabric adjacent the lower and upper surfaces of said sleeves, passing said sleeves and said adjacent sheets of fabric into a mold under heat and pressure causing the foamable resin composition to foam and the bonding resin to cure, the foaming action causing said generally circular cross sectional sleeves to expand outwardly toward the walls of mold thereby assuming a rectangular cross section, said sleeves and said adjacent sheets of fabric forming an integral structure within the mold, and withdrawing said structure continuously from the mold.

References Cited
UNITED STATES PATENTS

| | | | |
|---|---|---|---|
| 2,891,288 | 6/1959 | Daley | 156—79 X |
| 2,898,634 | 8/1959 | Alderfer | 264—47 X |
| 3,246,058 | 4/1966 | Voelker | 264—47 |
| 3,294,602 | 12/1966 | Francis et al. | 264—45 X |
| 3,298,884 | 1/1967 | Willy | 264—47 X |
| 3,329,750 | 7/1967 | Growald | 264—45 |
| 3,389,195 | 6/1968 | Gianakos et al. | 264—45 |
| 3,429,956 | 2/1969 | Porter | 264—47 |
| 3,530,029 | 9/1970 | Lemelson | 264—47 X |
| 3,541,639 | 11/1970 | Enicks | 264—47 |

DONALD E. CZAJA, Primary Examiner

H. S. COCKERAM, Assistant Examiner

U.S. Cl. X.R.

156—78, 79, 93, 245; 260—2.5 AE; 264—45, Dig. 57